United States Patent
Anderson et al.

(10) Patent No.: US 12,353,955 B2
(45) Date of Patent: Jul. 8, 2025

(54) TIME-MULTIPLEXED SUPERPIXEL-BASED QUANTUM-ARRAY READOUT SYSTEM

(71) Applicant: ColdQuanta, Inc., Boulder, CO (US)

(72) Inventors: Clifton Leon Anderson, Patterson, CA (US); Martin Tom Lichtman, Madison, WI (US); Matthew Ebert, Madison, WI (US)

(73) Assignee: ColdQuanta, Inc., Boulder, CO (US)

( * ) Notice: Subject to any disclaimer, the term of this patent is extended or adjusted under 35 U.S.C. 154(b) by 820 days.

(21) Appl. No.: 17/669,777

(22) Filed: Feb. 11, 2022

(65) Prior Publication Data

US 2023/0259803 A1   Aug. 17, 2023

(51) Int. Cl.
*G06N 10/40*   (2022.01)
*G06F 9/30*   (2018.01)
*G21K 1/00*   (2006.01)

(52) U.S. Cl.
CPC ......... *G06N 10/40* (2022.01); *G06F 9/30101* (2013.01); *G21K 1/006* (2013.01)

(58) Field of Classification Search
CPC ........ G06N 10/40; G06N 10/00; G06N 10/70; G21K 1/006; G06F 9/30101; G06F 13/42; H10N 60/12; G06K 19/06037; H01L 27/156
See application file for complete search history.

(56) References Cited

U.S. PATENT DOCUMENTS

| | | | | |
|---|---|---|---|---|
| 11,422,958 B2* | 8/2022 | Boothby | ................ | G06F 13/42 |
| 11,424,521 B2* | 8/2022 | Whittaker | .............. | G06N 10/40 |
| 11,526,463 B2* | 12/2022 | Maassen van den Brink | | ............ G06F 15/76 |
| 11,669,765 B2* | 6/2023 | Kelly | ..................... | H10N 60/80 706/62 |
| 11,989,622 B2* | 5/2024 | Ebert | .................. | G06F 9/30101 |
| 12,020,116 B2* | 6/2024 | Hoskinson | ............. | H10N 60/12 |
| 12,034,404 B2* | 7/2024 | Berkley | ................. | G06N 10/40 |

(Continued)

FOREIGN PATENT DOCUMENTS

| | | | | |
|---|---|---|---|---|
| CA | 2497759 C | * | 8/2013 | ............ B82Y 10/00 |
| CN | 110687583 B | * | 4/2021 | ............ G01T 1/202 |

(Continued)

OTHER PUBLICATIONS

So et al., Two-Photon Fluorescence Light Microscopy, Encyclopedia of Life Sciences, 2002 Macmillan Publishers Ltd., Nature Publishing Group, pp. 1-5.

*Primary Examiner* — Steven P Sax
(74) *Attorney, Agent, or Firm* — Michael J. Attisha; Samuel Means; Greenberg Traurig, LLP

(57) ABSTRACT

Quantum computing results can be stored in a quantum array of quantum-state carriers (QSCs) which must be read out in a form accessible to the classical world. The quantum array can be divided into regions that can be read in parallel. Each region is illuminated one QSC (e.g., atom) at a time and any resulting emissions are detected to determine the quantum state of each QSC and thus the value represented by the QSC. Multi-pixel superpixels are examined in each detection image to determine whether or not a respective QSC emitted in response to illumination. The field of view for each superpixel exceeds the area of the respective QSC, providing tolerance for misalignment of the photodetector relative to the quantum array.

10 Claims, 10 Drawing Sheets

(56) References Cited

U.S. PATENT DOCUMENTS

| | | |
|---|---|---|
| 2016/0071021 A1 | 3/2016 | Raymond |
| 2018/0285760 A1 | 10/2018 | Abdo |
| 2019/0064456 A1 | 2/2019 | Kim |
| 2020/0124749 A1* | 4/2020 | Takenaka ............ G01T 1/20183 |
| 2020/0250565 A1* | 8/2020 | Bronn .................. H05K 1/0216 |
| 2023/0297870 A1* | 9/2023 | Aeppli ................... G06N 10/00 |
| | | 324/300 |
| 2024/0302491 A1* | 9/2024 | Maskil .................... G01S 7/292 |

FOREIGN PATENT DOCUMENTS

| | | | |
|---|---|---|---|
| EP | 3572870 A1 * | 11/2019 | ............... G02F 1/39 |
| TW | 202220199 A * | 5/2022 | ......... G01N 21/6408 |
| WO | WO-2007120674 A2 * | 10/2007 | ............. A61B 6/037 |
| WO | WO-2017062735 A1 * | 4/2017 | ......... G01N 21/6489 |
| WO | WO-2018015738 A1 * | 1/2018 | ........... H01L 27/156 |
| WO | WO-2019038511 A1 * | 2/2019 | ....... G06K 19/06037 |
| WO | 2020236574 | 11/2020 | |
| WO | WO-2022119781 A1 * | 6/2022 | ........... G02F 1/3536 |

* cited by examiner

□ Emitting (Logic-1) Atom SuperPixel
■ Illuminated but Non-Emitting (Logic-0) Atom SuperPixel
▨ Non-Illuminated Atom Pixel

TIME-MULTIPLEXED SUPERPIXEL-BASED QUANTUM-ARRAY READOUT SYSTEM

BACKGROUND

Whereas classical digital computers manipulate units, e.g., bits, of classical information, quantum computers manipulate units, e.g., qubits, of quantum information. Both classical bits and quantum qubits can be represented physically using two-state carriers. Examples of two-state quantum carriers include an electron that can transition between a spin up and a spin down state, and an electron in an atom that can transition between a ground state and an excited state. A classical two-state carrier assumes one of the two states at any given time; a quantum two-state carrier can be in a coherent superposition of both states simultaneously.

Quantum computers vary in the underlying technology used to physically represent the qubits; thus, depending on the underlying technology, the quantum-state carriers can be cold-neutral atoms, ions, other molecular entities, superconducting circuits, quantum dots, nitrogen-vacuum centers in diamond, or other entities. One of the advantages of using cold neutral atoms or ions is that atoms of the same element and atomic weight are naturally identical so that manufacturing tolerances are not an issue (as they may be when the qubits are defined in states of superconducting circuits). Another advantage of cold neutral atoms is that they can be packed closely together without interacting, in contrast to, for example, ions. On the other hand, neighboring cold atoms can be made to interact, e.g., by causing them to enter Rydberg (very high excitation) states. Thus, cold atoms readily provide for large qubit-count quantum registers.

In a cold neutral atom register, atoms are held in a one-, two-, or three-dimensional optical array trap, e.g., formed as a lattice of crisscrossing laser beams. During computation, the atoms can, at least in principle, assume any of a continuum of quantum values. However, the process of reading out quantum-computation results causes the continuum of quantum states to collapse to a pair of binary values: upon readout, each atom either represents a zero (e.g., corresponding to a first eigenstate) or unity (e.g., corresponding to a second quantum state). The collapsing is probabilistic in that two QSCs having the same superposition state can collapse to different non-superposition eigenstates. One approach to readout involves illuminating the atoms so that they emit light on a quantum-state-dependent basis. A photodetector system can then be used to determine which atoms in a quantum register emit light; the quantum state and the associated value can then be determined from the presence versus absence of emissions.

The photo-detection is required to uniquely associate emissions with atom site positions in any detection scheme. When detecting emission from all sites in parallel, there must be at least one photodetector element ("pixel") per site and negligible crosstalk from other atom sites. The signal-to-noise ratio is optimal for a single detector per atom site position due to intrinsic per-pixel noise, however, alignment of the photodetector is critical and can be challenging. Using a higher-resolution sensor to oversample the register can address the alignment problem since image analysis can determine the proper alignment; however, there is a tradeoff in computational complexity; in addition, the signal-to-noise ratio is reduced due to multiple photodetector elements. So, what is needed includes increased alignment tolerances and higher signal-to-noise ratios.

DETAILED DESCRIPTION

The present invention provides for parallel time-multiplexed superpixel-based emissions mapping, e.g., imaging, of a quantum array to achieve quantum-state readouts with relaxed alignment tolerances and high signal-to-noise ratios. Herein, a "superpixel" is a group of picture elements (aka, "pixels") that is to be treated as a single pixel for some purposes. For example, intensity values or photon counts of the individual pixels can be summed or otherwise combined to obtain a photon count or other combined intensity value or for the superpixel. In some cases, the combining can involve simply selecting a single (e.g., the superpixel pixel with the highest intensity) superpixel pixel to determine a readout value. For example, if the center pixel of a 3×3-pixel superpixel stores an intensity value that is significantly higher than its neighbors, then it can be assumed that the center pixel is well aligned with an emitting atom so that the intensities of the neighboring pixels can be ignored for purposes of assigning a readout value.

Even in cases in which a photodetector is misaligned with respect to a quantum array, the combined superpixel value would correspond to the value a single pixel would have had if the alignment had been perfect. Thus, alignment tolerances can be relaxed in exchange for minor processing costs incurred when combining pixel values. In addition, the larger area covered by a superpixel increases the amount of emissions captured, so as to support high signal-to-noise ratios. Moreover, the superpixel approach addresses geometric mismatches, such as between rectangular quantum arrays and hexagonal detector arrays.

Figure 1:
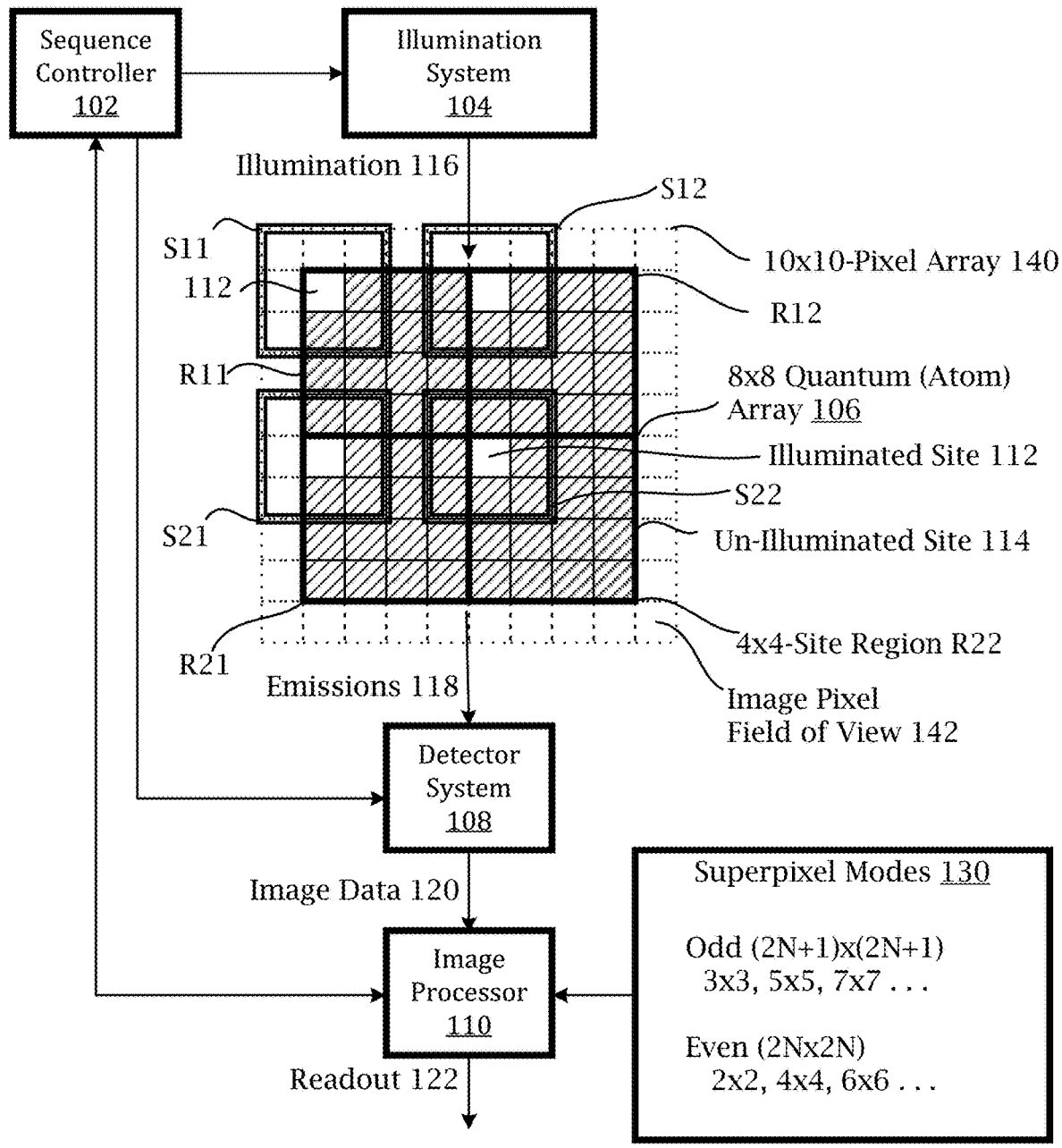
FIG. 1 is a schematic diagram of a time-multiplexed superpixel-based quantum array readout system shown with 2×2-pixel superpixels.

A time-multiplexed superpixel-based quantum-array readout system 100, shown in FIG. 1, includes a sequence controller 102, an illumination system 104, a quantum array 106, a detector system 108, and an image processor 110. Quantum array 106 is an optical array trap formed by illumination system 104. For expository purposes, array 106 is shown with eight rows and eight columns of array sites; in practice, arrays with much greater dimensions (in terms of numbers of sites) are used. Each of the 64 sites of array 106 is occupied by a quantum-state carrier (QSC), e.g., a rubidium 87 ($^{87}Rb$) atom, that can assume a logic-0 eigenstate, a logic-1 eigenstate, and superpositions of these logic states. During readout, the superposition states collapse into respective logic-1 and logic-2 eigen states. Readout system 100 is designed to identify the eigenstate or corresponding logic value for each of the atoms in array 106.

Atom array 106 is divided into regions R11, R12, R21, and R22 to be processed in parallel to increase readout performance. As illustrated, each region is constituted by a 4×4 subarray of atom sites. Alternative embodiments divide a quantum array into larger site-count regions, e.g., 64×64.

Illumination system 104 illuminates regions R11, R12, R21, and R22 in parallel. Each region is illuminated one atom site at a time. Thus, at the time represented in FIG. 1, the upper left atom site 112 of each region is illuminated, while the remaining atom sites 114 are unilluminated. Illumination system 104 provides illumination 116 which can be characterized as including one or more supersets of one or more illumination sets of wavelengths of electromagnetic radiation (EMR), e.g., visible, near infrared, and/or near ultraviolet light.

Each illumination set of wavelengths is selected to causes an illuminated atom to emit EMR on a state-dependent basis. For example, the illumination set of wavelengths can be selected so that recipient atoms in a quantum state representing a logic-1 emit, while recipient atoms in a quantum state representing a logic-0 do not. The illustrated illumination system provides two illumination sets: 1) a first illumination set that causes atoms in a logic-1 quantum state (but not atoms in a logic-0 quantum state) to emit; and 2) a second illumination set that causes atoms in a logic-0 quantum state (but not atoms in a logic-1 quantum state) to emit. Each illumination set can include EMR of a single wavelength, two wavelengths (e.g., for two-photon transitions), three wavelengths (e.g., for four-wave mixing), or more wavelengths. Depending on the atom and the illumination sets, the emissions can be spontaneous (e.g., as with fluorescence) or stimulated (e.g., as with detuned four-wave mixing).

Emissions 118 produced in response to illumination are captured by detector system 108, which outputs image data 120 in response. In the illustrated embodiment, detector system 108 uses a camera sensor to generate image data in the form of images. In alternative embodiment, the image data is not in the form of images, but includes data from which images can be generated, e.g., serial data mapping intensity to spatial positions. In such embodiments, images can, in effect, be assembly by image processor 110, which receives image data 120. In either case, image processor 110 processes the images to produce readout 122, which identifies the quantum states or corresponding logic values for each atom or other QSC in the array being read out.

Image processor 110 has a variety of operational modes including superpixel modes 130. Superpixel modes 130 includes odd and even superpixel modes. Odd modes include use of 3×3, 5×5, 7×7, etc., superpixels. Even modes include use of 2×2, 4×4, 6×6, etc., superpixels. As represented in FIG. 1, image processor is in a 3×3-pixel superpixel mode. Accordingly, image processor 110 assigns 3×3-pixel superpixels S11, S12, S21, and S22 respectively to regions R11, R12, R21, R22. The superpixels act as (inverse) image masks that track illumination 116 as to progresses from atom site to atom site.

At any given time, a superpixel is centered as much as possible on an expected location of an illuminated atom site 112. To allow for detector misalignment with respect to the atom array, the actual location of an illumined atom site is treated as unknown. To allow for such misalignment, each superpixel also covers all or part of the expected locations of unilluminated sites 114. Also, to allow for such misalignment for atom sites at region boundaries, superpixels can cross pixel boundaries to include all or portions of pixels in regions other than the region with which the superpixel is associated. Thus, for example, superpixel S22 includes expected site locations from all four regions R11, R12, R21, and R22. To allow for misalignment of sites at the boundary of array 106, superpixels can extend beyond the boundaries of atom array 106. Accordingly, the images processed by image processor 110 can be 10×10 pixel arrays 140 with some pixels having within their fields of view 142 areas outside the expected location of atom array 106.

Each image processed by image processor 110 identifies the quantum state and/or corresponding logic value for one atom per region processed in parallel based on the intensity information represented by the superpixels. For example, the nine intensity values associated with a 3×3-pixel superpixel can be summed or otherwise combined (e.g., a maximum across pixels of a superpixel can be used) to yield a single value. The single value can be thresholded to determine whether or not emissions were detected and thus the quantum state and/or logic value of the corresponding atom.

Since, where the pixel size is greater than or equal to the atom spacing, any emissions can be captured by the four pixels of a 2×2-pixel block. Therefore, in a 3×3-pixel superpixel, five of nine pixels of a 3×3 block can be discarded when combining values as they would only contribute noise to the total. So, one combination approach discards the five pixels with the lowest detections and sum or otherwise combine the remaining four. A more sophisticated approach is to constrain the four remaining pixels to a 2×2-pixel block. For example, in a 3×3-pixel superpixel, one approach obtains combination values for each of the four (overlapping) 2×2-pixel blocks and select the highest combination value. Discarding pixels can work to even greater advantage to superpixels (e.g., 4×4-pixel and 5×5-pixel superpixels) with greater than nine pixels.

Figure 2A:
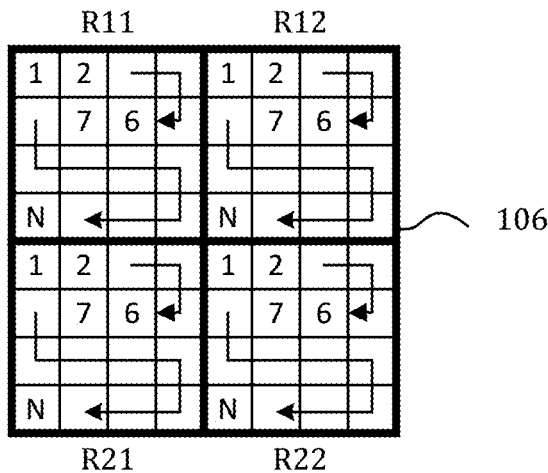
FIG. 2A is a schematic diagram of a quantum array of the system of FIG. 1 showing one order in which atoms in the array can be illuminated.
Figure 2B:
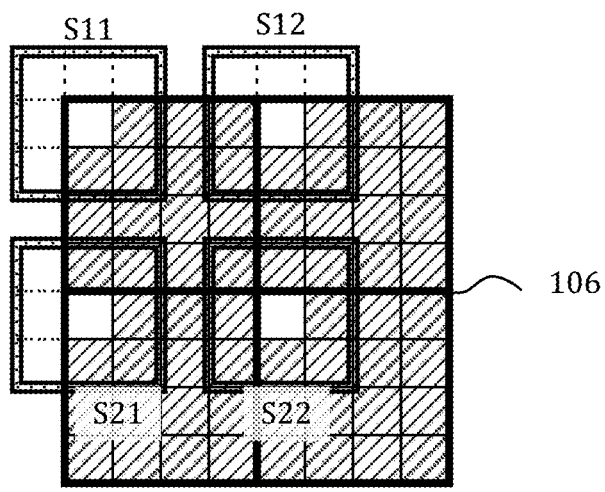
FIG. 2B is a schematic diagram of the quantum array of FIG. 2A showing the positions of 3×3-pixel superpixels while a first (upper left) array site for each of four regions is illuminated.
Figure 2C:
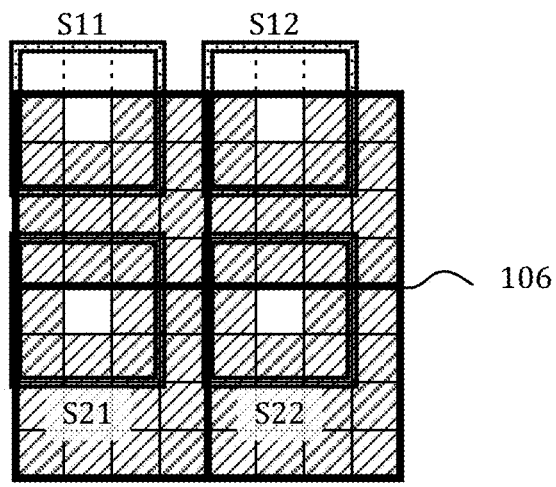
FIG. 2C is a schematic diagram of the quantum array of FIG. 2A showing the positions of 3×3-pixel superpixels while a second site for each of four regions is illuminated.

For a complete readout, all sites of each array region should be illuminated in turn. The arrows and numbers in FIG. 2A represent one illumination order; while other orders can be used. Each region is illuminated in the order indicated by the numbers 1, 2 ... N, where N is the number of pixels in a region; N=16 in the example of FIG. 1. Sites in different regions but with the same number are read in parallel. Superpixel positions when the upper left atom sites (1 in FIG. 2A) are illuminated in the context of an accurately aligned detector are shown in FIG. 2B. Superpixel positions when the next (2 in FIG. 2A) sites are illuminated in the context of an accurately aligned detector are shown in FIG. 2C. A comparison of FIGS. 2B and 2C indicates how the superpixel position follows the illumination of atom locations.

In effect, the transition from the superpixel positions of FIG. 2B to the superpixel positions of FIG. 2C involves moving superpixels one atom spacing to the right. Moving one atom spacing to the right involves shedding the left-pairs of pixels in the superpixels and annexing pairs of previously non-superpixel pixels to the right. In other words, superpixel movement can be effected simply by selecting which pixels to include in the superpixels based on which atom sites are being illuminated.

Figure 4:
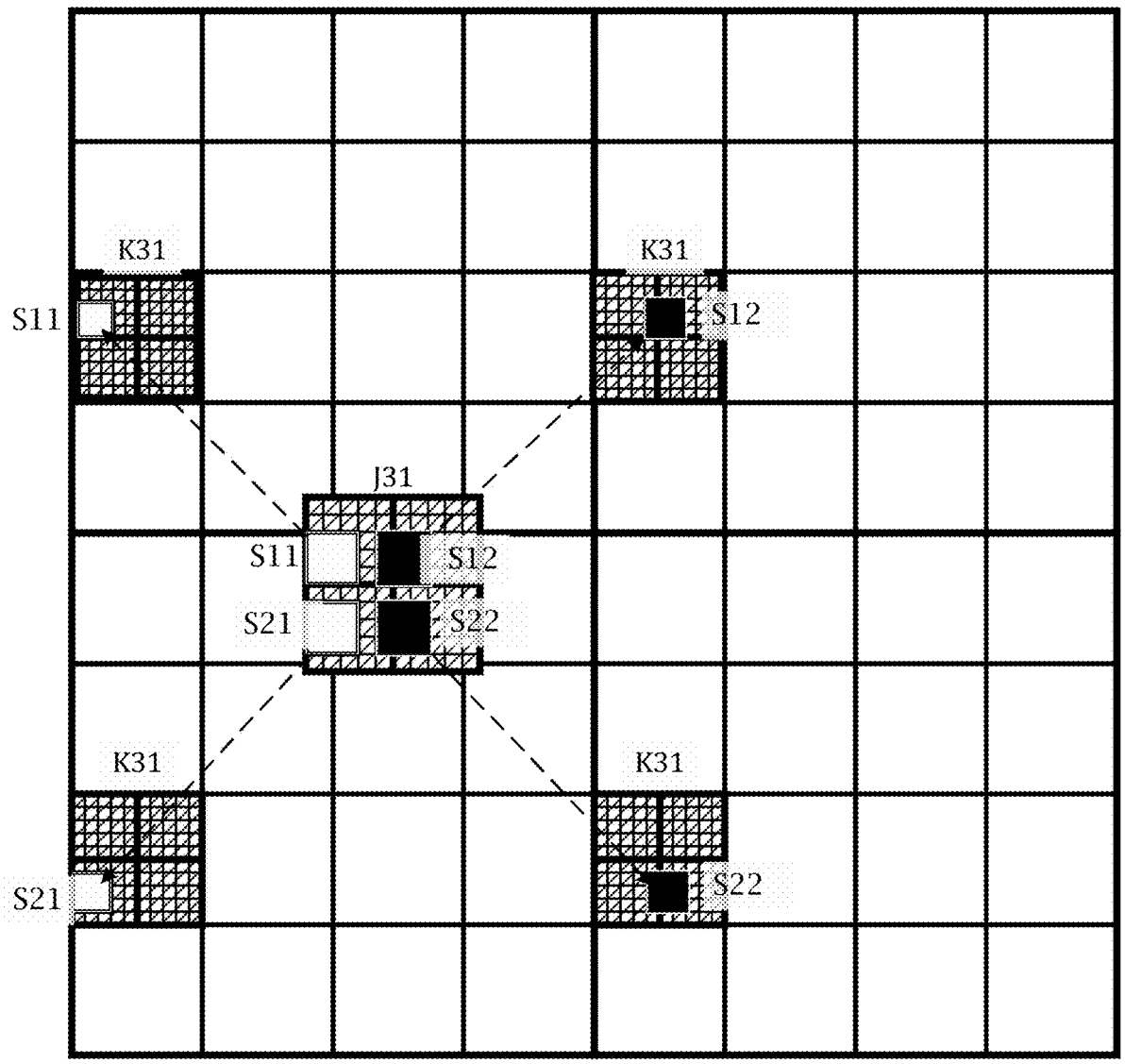
FIG. 4 shows an image to site mapping that is partially filled based on one of the images of FIG. 3.

Detector system 108 captures one 10×10-pixel image per atom site in a region. Since each region of array 106 has 4×4=16 array sites, 16 10×10-pixel images J11-J44, represented by example in FIG. 4, are captured. In general, each image includes superpixels 402 (solid white in FIG. 4) with a field of view that includes atoms that emitted in response to illumination, superpixels 404 (solid black in FIG. 4) with a field of view that includes atoms which were illuminated but did not emit in response to the illumination, and pixels 406 (shaded in FIG. 4) with fields of view that did not include illuminated atoms. In some embodiments, fewer than all regions are illuminated at a time. For example, the number of regions can exceed the parallelism that can be provided by illumination system 104 (FIG. 1). In that case, the regions can be grouped and sequenced one group at a time.

Figure 5:
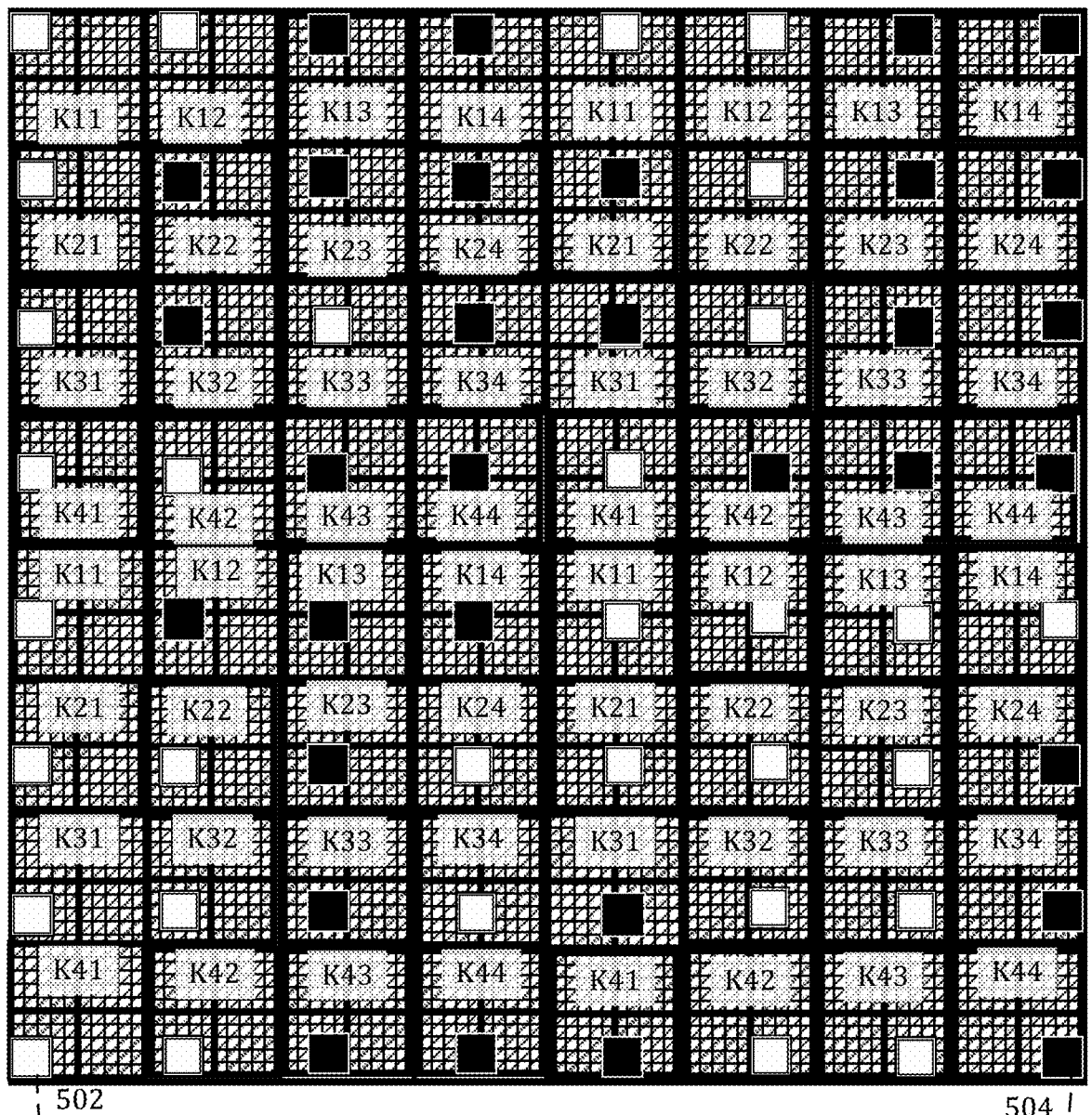
FIG. 5 shows a completed version of the image-to-site mapping of FIG. 4.

A partially filled image-to-site mapping 500, shown in FIG. 5, indicates how image processor 110 (FIG. 1) processes an image, e.g., image J31, to obtain a readout of quantum array 106. Image processor 110 locates the four superpixels S11, S12, S21, and S22 in image J31. From image J31, image processor 110 generates four single-superpixel images K31 respectively with superpixels S11, S12, S21, and S22 and distributes than to respective representatives of the corresponding atom location for those superpixels. The result of such processing of all 16 images (four each of J11-J44) is shown in completed image-to-site mapping 600 in FIG. 6, which includes one version per region of each of derived images K11-K44.

Figure 3:
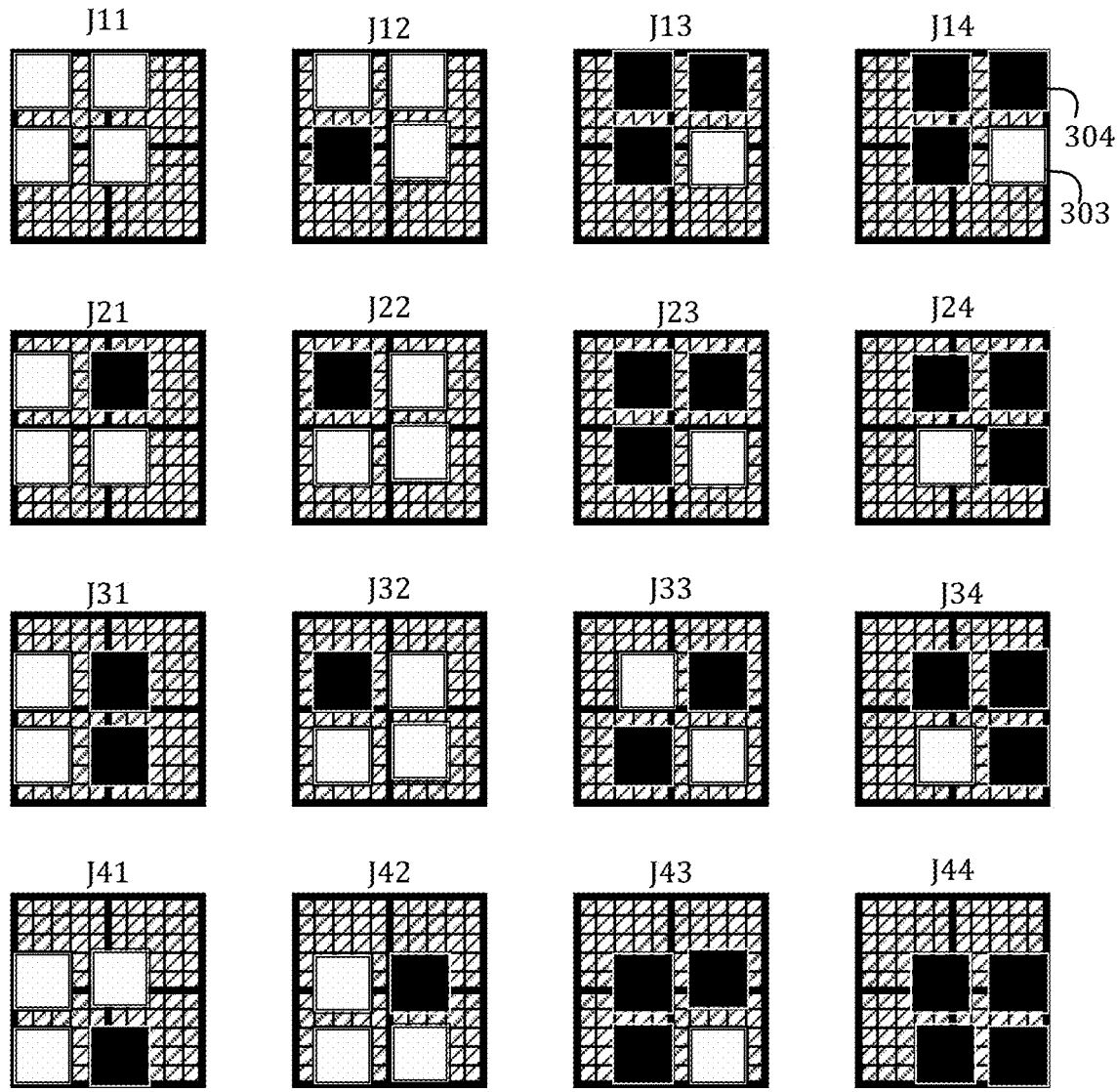
FIG. 3 shows a sequence 300 of 16 images (one per atom in a region) acquired using the detector system of the readout system of FIG. 1.

Mapping 600 includes 64 cells arranged in 8 rows and 8 columns to correspond to 8×8-site array 106. Each cell contains a derived 10×10-pixel image including a (solid shaded) 2×2-pixel superpixel and 60 shaded pixels that are masked out for the purposes of the readout. Each 10×10 pixel image K11-K44 includes exactly one superpixel selected from the four superpixels in the corresponding image J11-J44. The selected superpixel is the superpixel for the region containing the selected atom site. In FIGS. 3, 4 and 5, the solid superpixels are white or black to correspond to the detection or non-detection of emissions as indicated in images J11-J44 (FIG. 4).

Readout 140, as shown in FIG. 5, is, in effect, a representation of quantum array 106 in which each atom is replaced by the logical value represented by the atom's collapsed non-superposition eigenstate. Thus cell 502, which contains an emissions detection (white) superpixel, is mapped to a logic-1 in readout 122, while cell 504, which contains an emissions non-detection (black) superpixel is mapped to a logic-0 in readout 122. Other embodiments can produce readouts in other, mathematically equivalent, forms. Readout 122 is shown divided into four regions R11-R22, corresponding respectively to the like-labelled regions of quantum array 110.

Each cell of readout 122 is set to a logic-1 or a logic-0 based on the corresponding image with the corresponding mask from table 500 applied. For example, cell 506 of readout 122 contains a logic-1, which results from applying mask 502 to image J41 of region R21. Mask K41 excludes 81 pixels of image J41 leaving only the nine pixels in the lower left corner of image K41 to be examined. In the case of image K41, the lower-left nine pixels correspond to a 3×3-pixel superpixel in which fluorescence has been detected. Accordingly, a logic-1 is assigned to the lower left cell 506 of readout 122.

For another example, consider the lower right cell 508 of region R22 of readout 122. It is set based on image J44 of region R22 with mask 504 applied. Mask 504 calls for selection of the superpixel at the lower right of image J44 of region R22. This superpixel is dark, meaning an absence of fluorescence. The absence of fluorescence corresponds to the logic-0 value of cell 508. Each superpixel of images J11-J44 is a 3×3-pixel superpixel, which means that logic value of readout 122 is based on some combination of nine pixel values. For example, nine intensity or four photon counts can be summed or otherwise combined.

For 3×3-pixel superpixels with pixel sizes corresponding to atom spacing, readout 122 can represent valid results as long as any misalignment does not exceed one atom in the best-case scenario in which pixel size exactly matches atom spacing, and ½ atom spacing in a worst-case scenario in which pixel size differs slightly from atom spacing. For example, if the atoms are spaced on a 2-millimeter (mm) pitch, then misalignments up to 1 mm in either x (left/right) or y (up/down) dimension can be tolerated. Greater tolerance can be achieved using superpixels with more and/or larger pixels.

Herein, "pixel size" is shorthand for "field-of-view size". The field of view of a pixel can be changed dynamically during a sequence, e.g., by using a lens to zoom in and out. Accordingly, the invention provides for dynamically changing field-of-view size. One reason to do this would be a case where the atom spacing is non-uniform or dynamically changing.

Figure 6A:
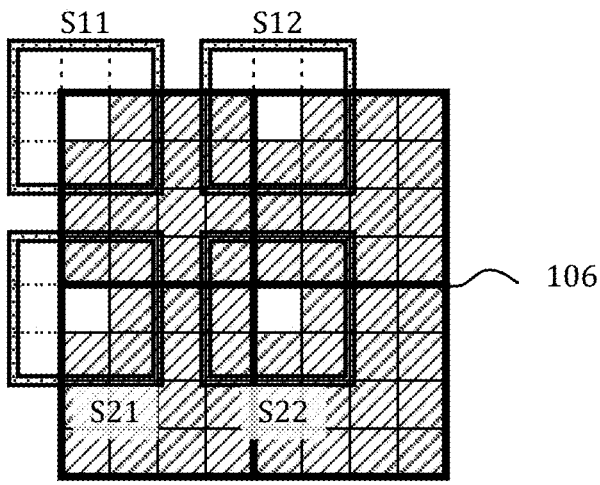
FIG. 6A shows the positions of 3×3-pixel superpixels in a case in which the photodetector is accurately aligned with respect to the quantum array.
Figure 6B:
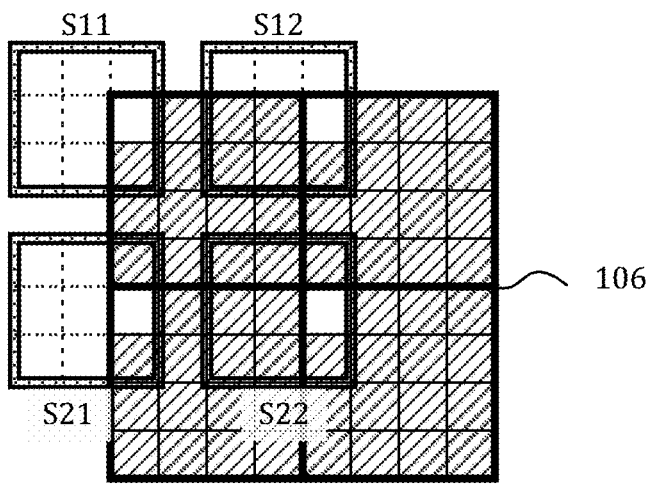
FIG. 6B shows the positions of 3×3-pixel superpixels in a case in which the photodetector is misaligned ½ atom to the left and ½ atom upward with respect to the quantum array.
Figure 6C:
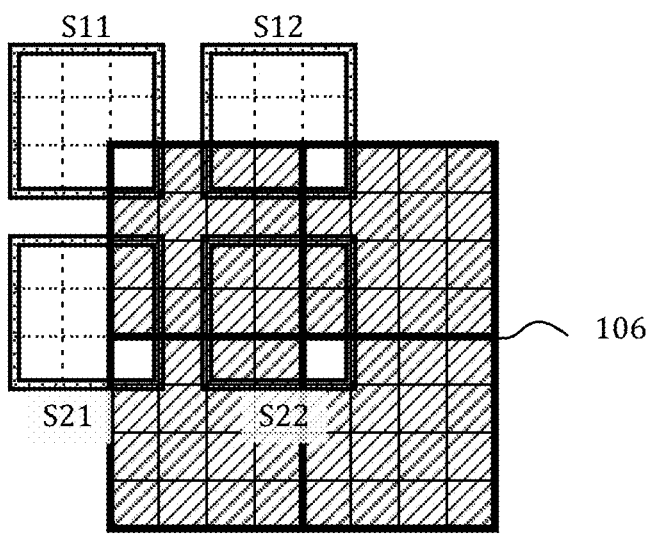
FIG. 6C shows the positions of 3×3-pixel superpixels in a case in which the photodetector is misaligned 1 atom to the left and 1 atom upward with respect to the quantum array.

FIG. 6A, which is, in effect, a copy of FIG. 2B, shows superpixel positions when the upper left sites of regions are illuminated in the context of an accurately aligned photodetector. FIG. 6B shows superpixel positions when the upper left sites of regions are illuminated in the context of a photodetector that is misaligned one atom to the left. FIG. 6C shows superpixel positions when the upper left sites of regions are illuminated in the context of a photodetector that is misaligned 1 atom to the left and 1 atom up. Any further movement of superpixel S11 to the left or up would leave some of the expected location of the illuminated pixel outside superpixel S11. Since this could impair detection, FIGS. 6A-6C show that the maximum alignment tolerance for a 3×3-pixel superpixel having pixels matching atom spacing is one atom spacing.

While FIGS. 6a-6C illustrate a case in which a 3×3-pixel superpixel achieves a misalignment tolerance of one atom spacing, this achievement is based on a scenario in which the pixel size (at the atom array) equals the atom spacing so that relative alignment remains constant as the illumination and superpixels move relative to the atom array. In other words, the superpixels remain centered on the expected atom locations. However, if the pixel size does not match atom spacing, this constant alignment or misalignment is not achieved, as explained with reference to FIGS. 7A to 7C.

Figure 7A:
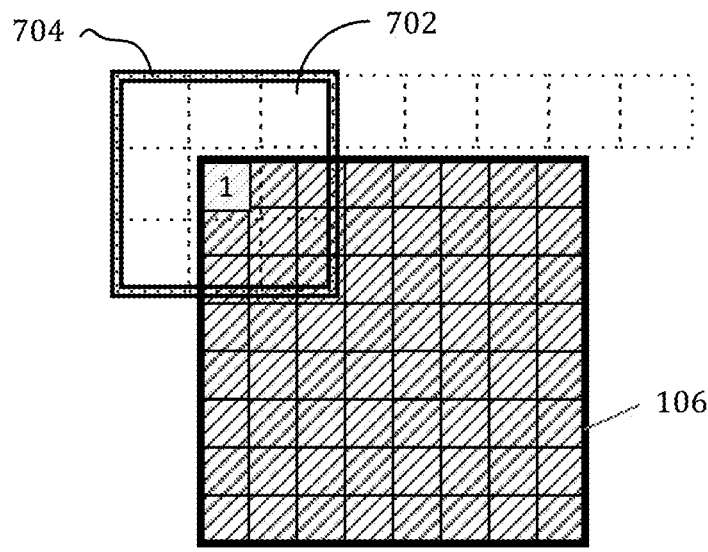
FIG. 7A shows the position of a superpixel constituted by an array of oversized image pixels relative to a first illuminated atom of a quantum array.
Figure 7B:
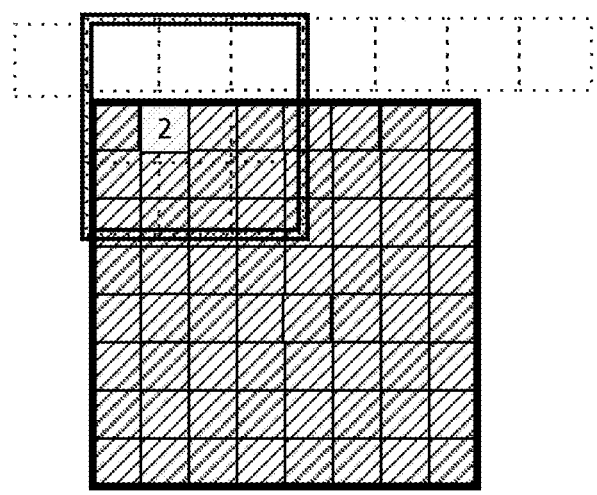
FIG. 7B shows the position of the superpixel of FIG. 7A while a second atom is illuminated.

In FIG. 7A, pixel dimensions are 1.5 times the atom spacing. For example, the atom spacing can be 2 µm and each pixel 702 of 3×3-pixel superpixel 704 has dimensions of 3 µm×3 µm. Superpixel 704 is shown centered on site 1 of atom array 706. When site 2 is illuminated, then, ideally, superpixel 704 would move one atom spacing to the right. However, the minimum movement for superpixel 704 is 1.5 atom spacings. Accordingly, in FIG. 7B superpixel 704 is not centered on site 2.

Figure 7C:
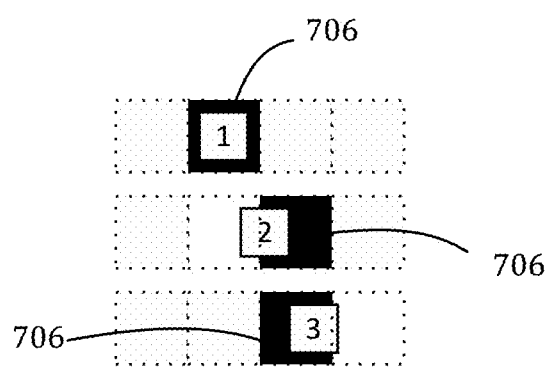
FIG. 7C provides a comparison of the positions of the superpixel of FIG. 7A relative to first, second, and third atoms of the quantum array.

FIG. 7C compares the alignments of center pixel 706 of superpixel 704 to sites 1, 2 and 3. Center pixel 706 is centered on site 1 but is off-center for sites 2 and 3. In fact, center pixel 706, and thus superpixel 704 are not moved as illumination moves from site 2 to site 3. Superpixel 704 must remain in place because the centers of expected site locations 2 and 3 both fall within center pixel 706—which provides the best alignment of superpixel 704 with expected locations of sites 2 and 3.

If it were somehow possible, e.g., using mirrors or moving the detector, to keep superpixel centered on expected locations of sites as illumination shifted from site to site, then the misalignment tolerance for the 3×3-pixel superpixel with pixel sizes of 1.5 atom spacings would be 1.25 atom spacings. However, ½ atom spacing must be deducted since the alignment varies, so the actual misalignment tolerance is 0.75 atom spacings. This same adjustment would also apply to FIGS. 6A-C if the pixel size were slightly off from the atom spacing. So, to be conservative, the misalignment tolerance for a 3×3 superpixel with pixels that nearly match atom spacing is ½ atom spacing.

If greater alignment tolerance is required, larger superpixels can be used. Either the number of pixels per dimension or the sizes of individual superpixel pixels can be increased or both. Since superpixels cannot exceed region size (in either dimension, otherwise they would overlap causing ambiguous readings), larger regions may be required in some cases, which could impact parallelism and processing time (since more images would have to be captured and processed).

Figure 8A:
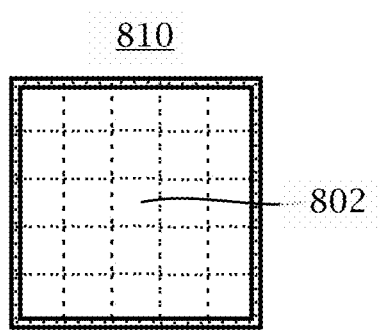
FIG. 8 is a schematic illustration of a superpixel including a 5×5 array of pixels.
FIG. 8B shows the positions of 2×2-pixel superpixels relative to a quantum array of FIG. 1.
FIG. 8C shows the positions of 4×4-pixel superpixels relative to the quantum array of FIG. 1.

A 5×5-pixel superpixel 800 is shown in FIG. 8A with 25 pixels. Assuming a match between pixel size corresponding to atom spacing, use of superpixel 800 could provide up to 2 atom spacings of misalignment tolerance. However, a small deviation could drop that to 1.5 atom spacings. Misalignment tolerance greater than 1.5 atom spacings can be achieved with larger pixels.

Figure 8B:
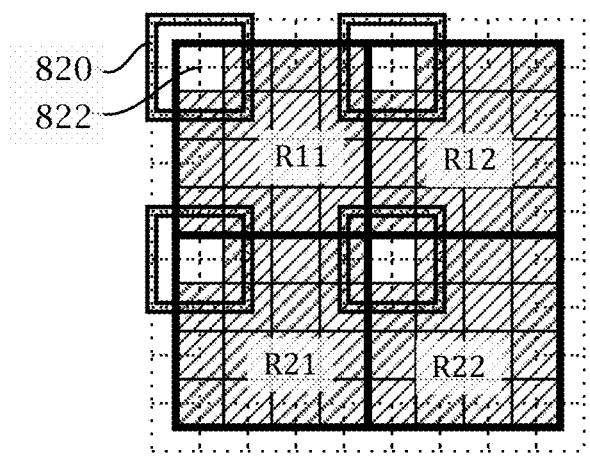

Atom array 106 is shown in FIG. 8B with 2×2-pixel superpixels with pixel sizes matching atom spacing. Unlike "odd" superpixels, e.g., 3×3, 5×5, 7×7, etc., even superpixels, e.g., 2×2, 4×4, 6×6, etc., do not have center pixels. Rather, the centers are where the corners of four pixels meet. With ideal matching of pixel size and atom spacing, use of a 2×2-pixel superpixel can achieve ½ atom misalignment tolerance. However, without ideal matching, the misalignment tolerance is 0. Thus, for most cases, 2×2-pixel superpixels should be constituted by pixels with dimensions greater than the atom spacing. Advantages of 2×2-pixel superpixels include reduction in the number of pixels to be processed, and fewer superpixel pixels contributing noise to the readout.

Figure 8C:
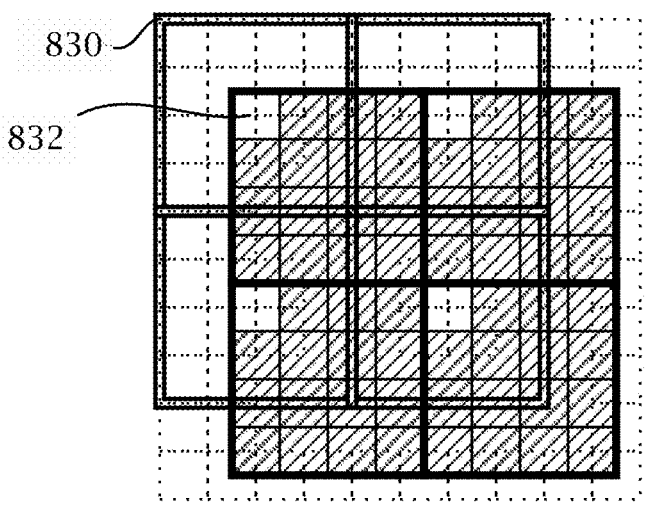

Atom array 106 is shown in FIG. 8C with four 4×4-pixel superpixel with pixel sizes matching atom spacing. As with the 2×2-pixel superpixel, the center of a 4×4-pixel superpixel is where four pixel corners meet. With ideal matching, a misalignment tolerance of 1.5 atom spacings could be achieved. Otherwise, a misalignment tolerance of 1 atom spacing can be achieved. Unsurprisingly, this is between the misalignment tolerances of a comparable 3×3-pixel superpixel (0.5 atom spacings) and a comparable 5×5-pixel superpixel (1.5 atom spacings). Note that the four 4×4-pixel superpixels contact each other but do not overlap. Larger superpixels would overlap, which would invite readout errors. For this reason, superpixels should not exceed region size in either of their dimensions.

Because even superpixels have 4-corner centers, while odd superpixels have single pixel centers, there are scenarios in which even and odd superpixels can be used in the same readout process. For example, if the center of an expected location of a site falls near the boundary of the center pixel of a 3×3-pixel superpixel, the superpixel could be switched to a 4×4-pixel superpixel for that site so that the expected location is nearer the center of the superpixel. This would slightly increase misalignment tolerance.

Each superpixel is constituted by image pixels. In the illustrated embodiment, an image is populated by square pixels. Other embodiments can use pixels with other geometries such as rectangular (e.g., 2×3) and hexagonal. It is not necessary that the pixel geometry match that of the quantum array. Typically, superpixels include four or more square pixels, or three or more hexagonal pixels. Rectangular superpixels can include as few as two pixels. In some generate cases, single-pixel superpixels are used.

Figure 9:
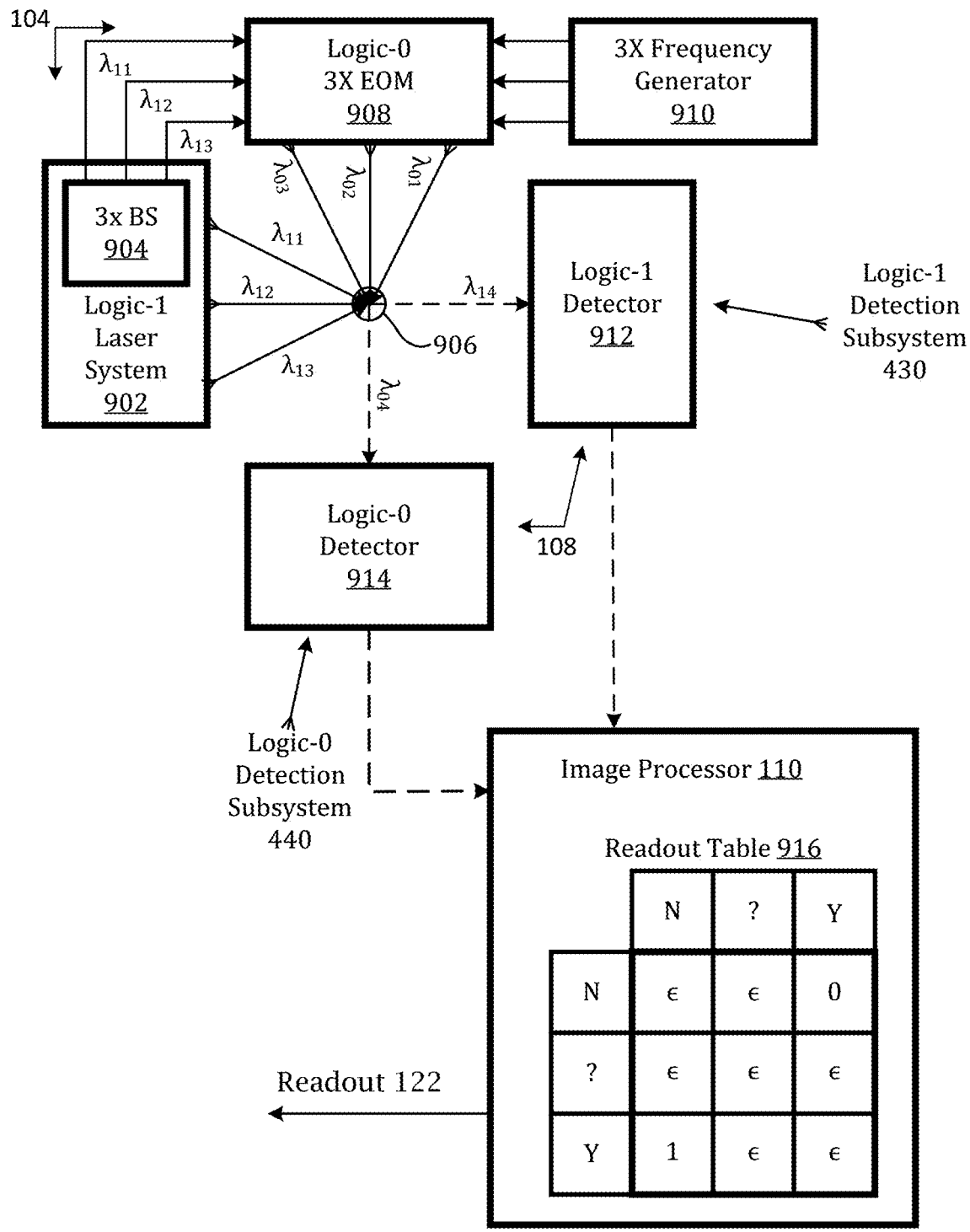
FIG. 9 is an alternative schematic illustration of the time-multiplexed superpixel-based quantum array readout system of FIG. 1, showing how positive detection of alternative quantum states is implemented.

A different view of time-multiplexed superpixel-based quantum-array readout system 100 is presented in FIG. 9 detailing the use of two wavelength sets to positively identify both logic-1 states and logic-0 states. This view is adapted from PCT patent application PCT/US21/61034, filed 2021 Nov. 29 entitled "Quantum-State Readout Using Stimulated Emissions", invented by Alexander Georgiyevich Radnaev, assigned to ColdQuanta, Inc., and incorporated herein by reference.

Illumination system 104 includes a logic-1 laser system 902 that provides laser light of wavelengths $\lambda_{11}$, $\lambda_{12}$, $\lambda_{13}$. Logic-1 laser system 902 includes a bank 904 of three beamsplitters that splits the laser lights into two sets of beams with wavelengths $\lambda_{11}$, $\lambda_{12}$, $\lambda_{13}$. One set is directed to an $^{87}$Rb atom 906, which implements detuned four-wave mixing so as to stimulate highly-directional emissions of a fourth wavelength $\lambda_{14}$. The other set of beams with wavelengths $\lambda_{11}$, $\lambda_{12}$, $\lambda_{13}$ are input to a bank 908 of three electro-optic modulators (EOMs). The EOMs modulate the beams with wavelengths $\lambda_{11}$, $\lambda_{12}$, $\lambda_{13}$ according to frequency generated by a bank 910 of frequency generators to convert the beams with wavelengths $\lambda_{11}$, $\lambda_{12}$, $\lambda_{13}$ to beams with wavelengths $\lambda_{01}$, $\lambda_{02}$, $\lambda_{03}$. The beams with wavelengths $\lambda_{01}$, $\lambda_{02}$, $\lambda_{03}$ are directed to atoms 906 so as to stimulate highly-directional emissions of wavelength $\lambda_{04}$.

The emissions of wavelength $\lambda_{14}$ are directed to a logic-1 detector 912 of detector system 108, while the emissions of wavelength $\lambda_{04}$ are directed to a logic-0 detector 914 of detector system 108. The emissions of wavelength $\lambda_{04}$ are orthogonal to the emissions of wavelength $\lambda_{14}$ so detectors can be spaced apart and so that emissions crosstalk is negligible. Detectors 912 and 914 provide image data to image processor 110.

Image processor 110, using a readout table 916, converts superpixel intensity levels to readout values, e.g., quantum states or logic values. Intensity levels are thresholded. Intensities above a logic-1 threshold are interpreted as a detection (Y). Intensities below a logic-0 threshold are interpreted as a non-detection (N). The logic-1 threshold is above the logic-0 threshold to exclude ambiguous detections. In other words, intensities between these thresholds are treated as errors (e). Other error conditions can occur: 1) when both detectors 912 and 914 fail to detect emissions from an atom, the corresponding atom site may be vacant; 2) when both detectors 912 and 914 detect emissions, an error of unknown type is indicated as the atom cannot be in both logic-0 and logic-1 states concurrently. In normal operations (without errors), each atom will be assigned a logic-0 or a logic-1 for readout 122.

Figure 10:
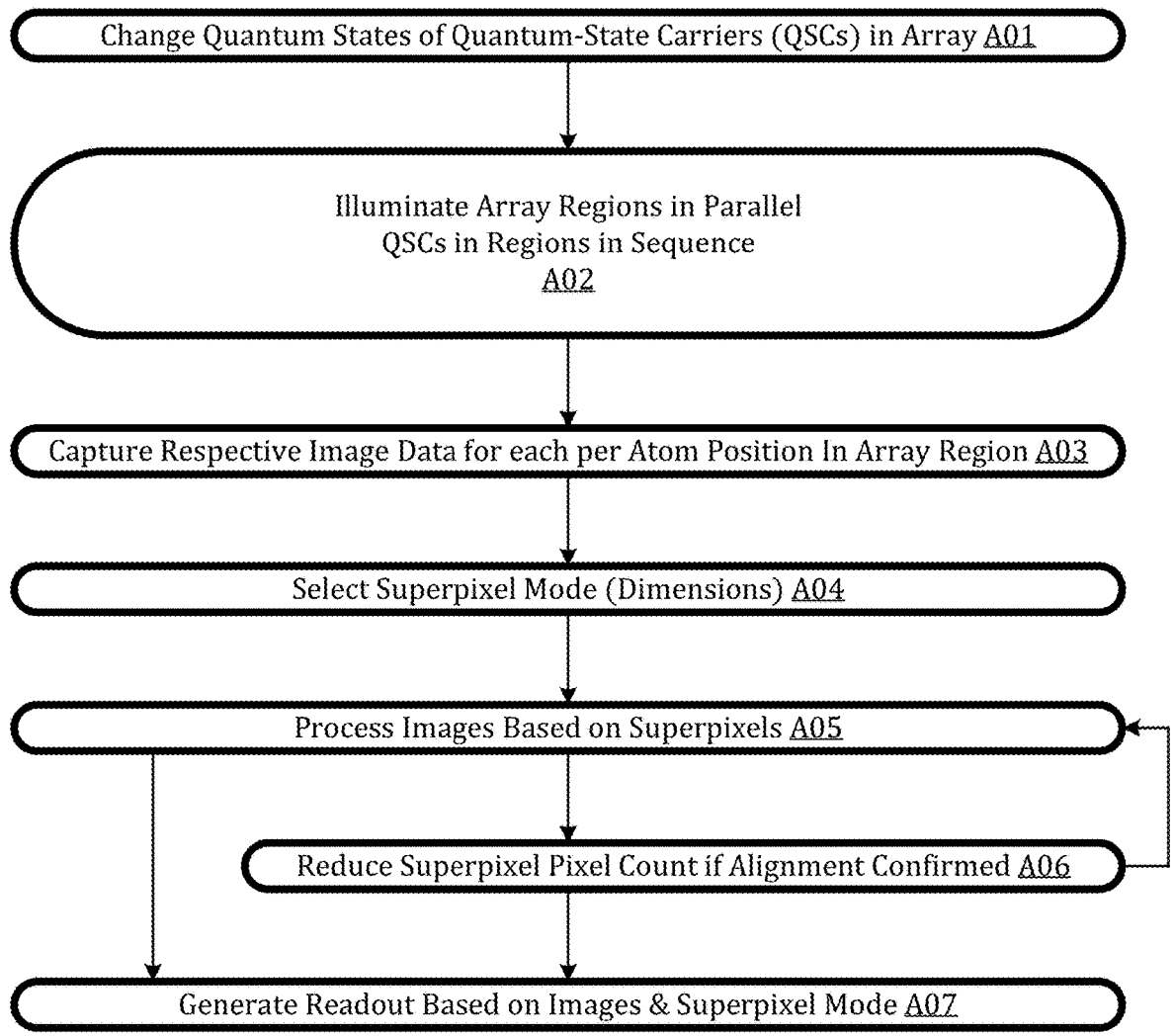
FIG. 10 is a flow chart of a time-multiplexed superpixel-based quantum array readout process implementable in the system of FIGS. 1 and 9 and on other systems.

A time-multiplexed superpixel-based quantum-array readout process A00 is flow charted in FIG. 10. At A01, quantum states of quantum-state carriers (QSCs) in an array are changed. The changes can result, for example, from execution of a quantum program or circuit, or as a result of use of the array as a sensor. The changes can result in particles in superposition and/or non-superposition quantum states. As is understood by those skilled in the art, quantum particles in a superposition state will collapse to non-superposition states during a readout process. The end result of the readout can be a mapping of non-superposition quantum states to array locations of the quantum particles and/or of logic values represented by those non-superposition quantum states.

At A02, the quantum particles of the array are illuminated by electromagnetic radiation (EMR), e.g., visible, near infrared, or near ultraviolet light. The illumination can include a superset of one or more illumination sets of wavelengths. Each set of wavelengths is selected so that quantum particles in one quantum state (e.g., a logic-1 state) will emit EMR in response to EMR characterized by the illumination set and quantum particles in another quantum state (e.g., a logic-0 state) will not emit EMR in response to EMR characterized by the illumination set. Additional illumination sets can be used for additional pairs of quantum states, for example, a logic-0 state would result in emissions in response to a second illumination set, while a logic-1 state would not result in emissions in response to the second illumination set. For readout purposes, the quantum array is divided into regions, some or all of which can be illuminated in parallel to increase readout throughput. Within a region, quantum particles are illuminated one at a time to avoid intra-region cross talk.

An illumination set can include one or more wavelengths. For example, a single wavelength can be used to excite an $^{87}$Rb atom to a state from which the atom would spontaneously fluoresce. Alternatively, such a transition can be accomplished with a two-photon excitation. For another alternative, an illumination set can include three illumination wavelengths to cause emission of a fourth wavelength in a four-wave mixing process. The emissions can be spontaneous (e.g., as with fluorescence) or stimulated (e.g., as with detuned four-wave mixing).

At A03, image data is captured to detect potential emissions in response to illumination. Depending on the embodiment, the image data can be in the form of images or of other data that can be used, e.g., by the image processor, to construct images. There can be at least one image per QSC in a region. Each image indicates whether or not emissions resulted from illumination for the respective QSC in each of the regions being processed in parallel. The resolution of the images can be within an order of magnitude of the (average) QSC spacing in the quantum array. Higher resolutions require greater processing to interpret the images, while lower resolutions can compromise misalignment tolerances.

At A04, a superpixel mode is selected, e.g., based on a setting of image processor 110. The setting mode can be fixed or adaptive. In a fixed mode, pixel dimensions are set at the beginning and not changed throughout the readout process. In an adaptive mode, initial superpixel dimensions are selected, but can be changed based on analysis of initial images. For example, a 5×5-pixel superpixel can be reduced to a 3×3-pixel or even a 1×1 pixel superpixel if it turns out to be well aligned or misaligned by a whole number of pixels. Alternatively, the 5×5-pixel superpixel can be reduced to a 4×4 pixel superpixel or a 2×2-superpixel is misaligned by some intermediate amount. In either case, superpixels of varied sizes can be used for different regions or different pixels within a region. In addition, pixel sizes can be selected.

At A05, if the detector system output image data from which images can be structed, then, images are constructed at A05. In any case, at A05, images are processed to yield the desired readout result for the quantum array. Only a subset of the image pixels needs to be examined; a contiguous group of such pixels constitutes a superpixel. Each superpixel includes pixels with fields of view that include an illuminated QSC and sufficient nearby pixels to provide a desired level of misalignment tolerance. Each image includes a superpixel for each region represented by the image. Pixels not included in a superpixel can be ignored or checked for error conditions such as spurious emissions. Emissions detections by the pixels of a superpixel can be summed or otherwise combined to yield a single capture value for the superpixel. Based on such a value, the superpixel value can indicate the quantum state or a corresponding logic value for a respective QSC.

If at A04, an adaptive superpixel mode is selected, then, at A06, the size of a superpixel can be adjusted based on analysis of preceding images. If at A04, a fixed mode was selected, then superpixel sizes are not adjusted based on analysis of preceding images and action A06 is omitted. Even in fixed node, superpixel sizes can be adjusted if planned as part of the selected fixed mode. Whether or not action A06 is skipped, a readout is generated based on the images and associated superpixels at A07.

In the illustrated embodiment, image processing is performed by an image processor that is separate from the detector system. In an alternative embodiment, image processing can be performed, in whole or in part, by the detector system. More specifically, dynamically reconfigurable pixel binning can be implemented in the detector system to combine the outputs of detector elements that belong to the same superpixel. For example, all pixels of a superpixel could be binned together to yield a single value for the superpixel. The binning would be dynamically reconfigured to track the effective movement of the superpixel. Alternatively, dynamic reconfiguration could be used to sequentially combine pixel outputs for each of the four 2×2 blocks of a 3×3 superpixel so that the selected block would only output a single value to a gain stage of a detector.

Herein, a "system" is a group of interacting or interrelated elements that act according to a set of rules to form a unified whole. A "process" is a system in which the elements are actions. "Quantum" characterizes a system as exhibiting or using quantum-mechanical phenomena such as eigenstates (solutions to Schrödinger's time dependent or time independent wave equation), superposition, and entanglement. "Quantum states" include eigenstates and superpositions of eigenstates. A "quantum simulator" is a quantum system used to emulate another quantum system. Herein, a "quantum state carrier" (QSC) is any physical system that can assume alternative eigenstates and superpositions of those eigenstates. Examples of QSCs include superconducting circuits, quantum dots in semiconductor hosts, color centers in a solid-state host (e.g., nitrogen-vacuum centers in diamond) and neutral and charged atoms and molecules.

A "quantum information-processing system" is a quantum system that uses quantum states to represent quantum information." Herein, "information" is organized data. "Bits" are the smallest units of classical information and can assume two values such as logic-0 and logic-1. "Qubits" are the smallest unit of quantum information and can assume values corresponding to points on a unit circle in a complex plane, in other words, values of the form a+bi, wherein a and b are real numbers, i is the square root of negative one (−1), and $a^2+b^2=1$. Qubits and larger units of quantum information (e.g., qutrits and other qudits), can be represented by quantum state carriers with a sufficient number of alternative eigenstates. A "quantum computer system" or "quantum computer" is a quantum information processing system that processes quantum information by manipulating quantum states in accordance with instructions.

Herein, an "array" is an ordered series or arrangement of elements. For example, atoms can be arranged in square array having four rows and four columns, with the rows and columns having the same inter-element spacing. A "quantum array" is an array in which the elements are quantum state carriers.

Herein, "electromagnetic waves" or "EM waves" encompasses ionizing radiation, ultraviolet light, visible light, infrared light, microwaves, and radio waves. Of interest herein, are wavelengths from 10 nanometers (nm) to 100,000 nm, corresponding to a frequency of range from very-low frequency 3 kilohertz (kHz) to extreme ultraviolet 30 petahertz (30 PHz), the visible and near-infrared light being most relevant to the illustrated embodiment. "Electromagnetic radiation" or "EMR" denotes EM waves propagating through space carrying electromagnetic radiant energy. Herein, a "waveguide" is a structure along which propagation of EM waves is confined. For example, a waveguide can be an elongated structure with a high index of refraction bounded by material with a low index of refraction such that internal reflections confine propagating wave to the elongated structure. Herein, an "EM radiator" is a device that converts EM waves propagating in a waveguide to electro-magnetic radiation (EMR). For example, the radiator can be a diffraction grating.

Herein, "illuminate" means "expose to electro-magnetic radiation". In the illustrated embodiments, the electro-magnetic radiation (EMR) includes visible and near infra-red light produced by lasers. However, other embodiments use EMR with wavelengths above and below (e.g., ultraviolet light) this range and produced by sources other than lasers. Herein, a "quantum-state carrier" or "QSC" is any entity that can assume two or more quantum states. Examples of QSCs include atoms, other molecular entities (e.g., ions, polyatomic molecules), photons, superconducting circuits, quantum dots, and nitrogen-vacuum centers.

The illustrated quantum registers are formed using optical array traps, e.g., formed using orthogonal sets of laser beams, interference patterns, and/or optical tweezers. Herein, a "region of an array" consists of a contiguous subset of sites of the array. In the illustrated embodiments, the regions collectively encompass all sites of an array. Depending on the embodiment, all regions of an array can be illuminated in parallel or as few as two at a time can be illuminated in parallel. "In parallel" does not require synchronicity; however, the timings must be such that multi-region emissions maps can be captured.

Herein, detector resolution and the resolution of images produced by the photodetector system corresponds more closely, percentagewise, to the size of a region than to the size of a site. For example, if the pitch of the sites in quantum array 106 (FIG. 1) is two microns (2 μm), the site size is 2 μm by 2 μm. Regions R11-R22 have dimensions of 6 μm by 6 μm. In that case, the detector and map/image resolution are closer percentagewise to 6 μm than 2 μm; in other words, the resolution is greater than 3 μm rather than less than 3 μm. (3 μm is 50% greater than 2 μm and 50% less than 6 μm; so, 3 μm is the equipoise in this example.)

Herein, all art labelled "prior art", if any, is admitted prior art; all art not labelled "prior art", if any, is not admitted prior art. The illustrated embodiments, variations thereupon and modifications thereto are provided for by the present invention, the scope of which is defined by the following claims.

What is claimed is:

1. A quantum-state readout process comprising:
   illuminating with illumination electro-magnetic radiation (EMR) plural regions of a quantum-state carrier (QSC) array of QSCs, the QSC array defining plural QSC sites for containing QSCs, each of the regions including plural ones of the QSC sites, each region being illuminated one QSC site at a time, each of the QSCs having first and second quantum states, each of the QSCs, when in its first quantum state, emitting emissions EMR in response to the illumination of the respective QSC site;
   sequentially capturing emissions maps of the QSC array, each emissions map consisting of an array of pixels;
   grouping pixels of at least one emissions map into multi-pixel superpixels such that each superpixel has within its field of view an optimal alignment position for each QSC site most recently illuminated at the time the emissions map was captured, each multi-pixel superpixel being larger than a respective QSC site of the QSC array and no larger than the region to which the respective QSC site resides, at least one superpixel having areas of at least two regions in its field of view while the respective QSC is illuminated;
   for each QSC site of the QSC array, making determinations whether or not the QSC site contained a QSC in its first quantum state at the time the QSC was illuminated based on pixel values of pixels in respective superpixels; and
   generating a quantum-state readout based on the determinations.

2. The quantum-state readout process of claim 1 wherein the illumination EMR and the emissions EMR are infrared, visible, or ultraviolet light, the QSC array is an optical trap, the QSCs are atoms, the first quantum state is an energy level of the atom, and the emissions are fluorescence, phosphorescence or the result of four-wave mixing.

3. The quantum-state readout process of claim 1 wherein each of the QSCs, when in its second quantum state, not emitting emissions EMR in response to the illumination of the respective QSC site.

4. The quantum-state readout process of claim 1 further comprising reducing superpixel sizes for subsequent emissions maps based on examination of one or more preceding image maps.

5. The quantum-state readout process of claim 1 wherein the illuminating includes illuminating using a first illumination set of one or more illumination wavelengths and a second set of one or more illumination wavelengths, each of the QSCs, when in its first quantum state, emitting first emissions EMR in response to the illumination of the respective QSC site using illumination EMR having the first illumination set of wavelengths, when in a second quantum state, emitting second emissions EMR in response to the illumination of the respective QSC site using illumination EMR having the second illumination set of wavelengths.

6. A quantum-state readout system comprising:

an illumination system for illuminating with illumination electro-magnetic radiation (EMR) plural regions of a quantum-state carrier (QSC) array of QSCs, the QSC array defining plural QSC sites for containing QSCs, each of the regions including plural ones of the QSC sites, each region being illuminated one QSC site at a time, each of the QSCs having first and second quantum states, each of the QSCs, when in its first quantum state, emitting emissions EMR in response to the illumination of the respective QSC site;

an emissions mapping system for sequentially capturing emissions maps of the QSC array, each emissions map consisting of an array of pixels; and a mapping processor system generating a quantum-state readout by grouping pixels of at least one emissions map into multi-pixel superpixels such that each superpixel has within its field of view an optimal alignment position for each QSC site most recently illuminated at the time the emissions map was captured, each multi-pixel superpixel being no larger than the region to which a respective QSC site resides, at least one superpixel having areas of at least two regions in its field of view, and for each QSC site of the QSC array, making determinations whether or not the QSC site contained a QSC in its first quantum state at the time the QSC was illuminated based on pixel values of pixels in respective superpixels.

7. The quantum-state readout system of claim 6 wherein the illumination EMR and the emissions EMR are infrared, visible, or ultraviolet light, the QSC array is an optical trap, the QSCs are atoms, the first and second quantum states are respective energy levels of the atoms, and the emissions are fluorescence, phosphorescence or the result of four-wave mixing.

8. The quantum-state readout process of claim 6 wherein each of the QSCs, when in its second quantum state, not emitting emissions EMR in response to the illumination of the respective QSC site.

9. The quantum-state readout system of claim 8 further comprising wherein the mapping analysis system reduces superpixel sizes for subsequent emissions maps based on examination of one or more preceding image maps.

10. The quantum-state readout system of claim 6 wherein the illuminating includes illuminating using a first illumination set of one or more illumination wavelengths and a second set of one or more illumination wavelengths, each of the QSCs, when in its first quantum state, emitting first emissions EMR in response to the illumination of the respective QSC site using the first illumination set of wavelengths, when in a second quantum state, emitting second emissions EMR in response to the illumination of the respective QSC site using the second illumination set of wavelengths.

\* \* \* \* \*